(12) United States Patent
Wang et al.

(10) Patent No.: US 6,999,416 B2
(45) Date of Patent: Feb. 14, 2006

(54) BUFFER MANAGEMENT FOR SUPPORT OF QUALITY-OF-SERVICE GUARANTEES AND DATA FLOW CONTROL IN DATA SWITCHING

(75) Inventors: Linghsiao Wang, Irvine, CA (US);
Craig Barrack, Irvine, CA (US);
Rong-Feng Chang, Irvine, CA (US)

(73) Assignee: Zarlink Semiconductor V.N. Inc., Irvine, CA (US)

( * ) Notice: Subject to any disclaimer, the term of this patent is extended or adjusted under 35 U.S.C. 154(b) by 889 days.

(21) Appl. No.: 09/935,533

(22) Filed: Aug. 23, 2001

(65) Prior Publication Data
US 2002/0039350 A1 Apr. 4, 2002

Related U.S. Application Data

(60) Provisional application No. 60/236,168, filed on Sep. 29, 2000.

(51) Int. Cl.
*H04J 1/16* (2006.01)
(52) U.S. Cl. .................. 370/230; 370/412; 370/428
(58) Field of Classification Search ............ 370/412, 370/413, 392, 428, 429, 395.72, 400–401, 370/230, 356
See application file for complete search history.

(56) References Cited

U.S. PATENT DOCUMENTS 6,219,728 B1 * 4/2001 Yin ..................... 710/52
6,298,340 B1 * 10/2001 Calvignac et al. ............ 707/3
6,463,068 B1 * 10/2002 Lin et al. ................. 370/414
6,510,160 B1 * 1/2003 Nikuie et al. ............. 370/412
6,687,247 B1 * 2/2004 Wilford et al. ............ 370/392

OTHER PUBLICATIONS

Bertsekas et al., Data Networks, 1992, pp. 496-499, 2nd Ed., Prentice Hall, Upper Saddle River, NJ.
IEEE Std 802.3, pp. 1205-1215, 1998 Edition.

* cited by examiner

*Primary Examiner*—Ricky Ngo
*Assistant Examiner*—Richard Chang
(74) *Attorney, Agent, or Firm*—Lawrence E. Laubscher, Jr.

(57) ABSTRACT

A method of utilizing shared memory resources in switching Protocol Data Units (PDUs) at a data switching node is presented. The method includes reserving: a temporary memory storage portion for storing PDUs prior to queuing for processing thereof, a Class-of-Service memory storage portion to provide support Quality-of-Service guarantees, a shared memory-pool portion and an input port memory storage portion enabling non-blocking input port flow control. Provisions are made for PDU discard decisions to be delayed until after PDU headers are inspected subsequent to the receipt of each PDU. Provisions are made for well-behaved data flows conveyed via an input port to be protected against blocking from misbehaving data flows conveyed via other input ports of the data switching node. The advantages are derived from a memory management scheme which can be equally applied in a PDU discard and a flow control environment to reduce PDU discard instances at a data network node implementing the memory management scheme while reducing memory storage requirements.

28 Claims, 4 Drawing Sheets

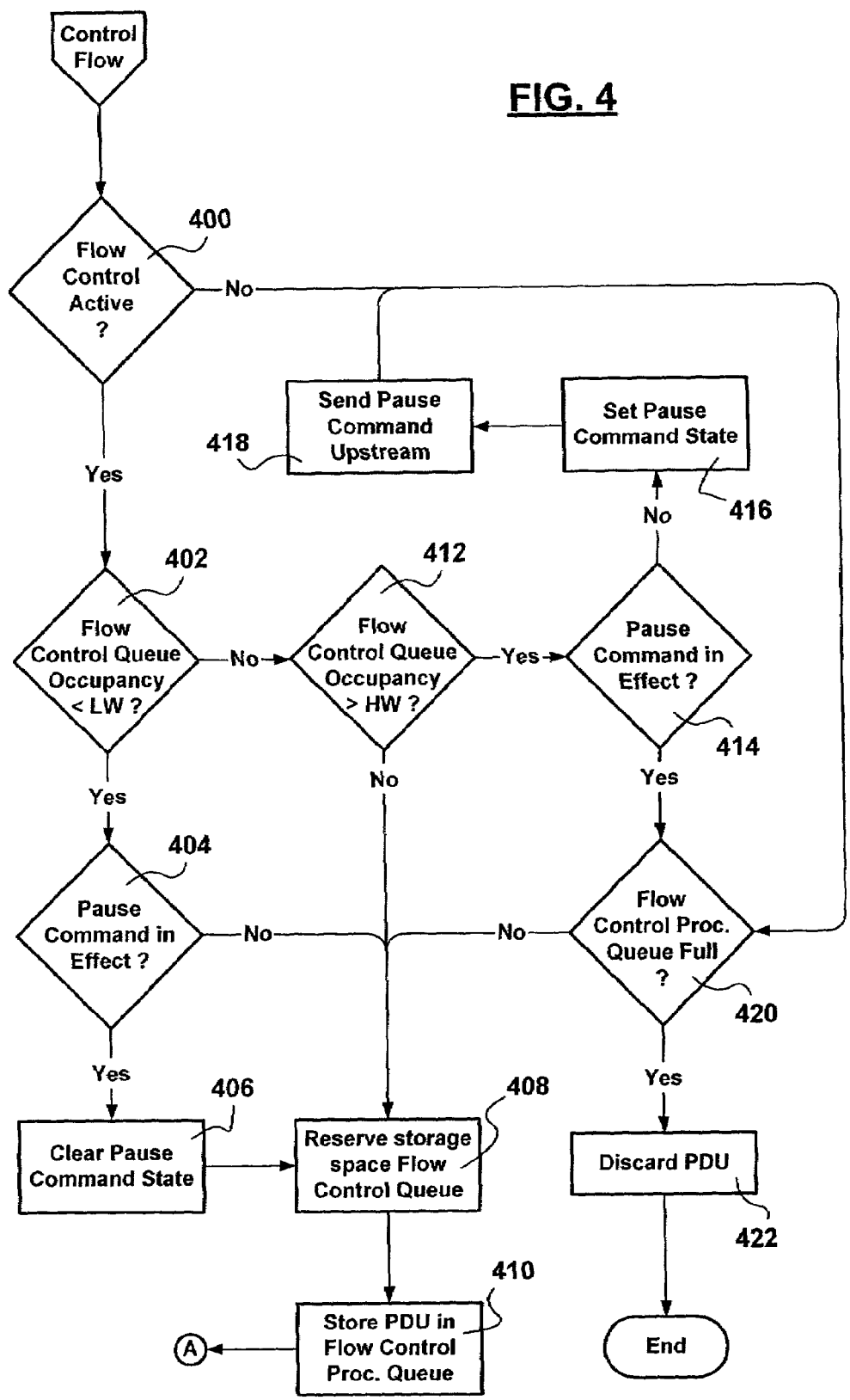

BUFFER MANAGEMENT FOR SUPPORT OF QUALITY-OF-SERVICE GUARANTEES AND DATA FLOW CONTROL IN DATA SWITCHING

This application claims the benefit of U.S. provisional application No. 60/236,168 filed Sep. 29, 2000.

FIELD OF THE INVENTION

The invention relates to data switching in data transport networks, and in particular to improved methods of managing memory storage resources at data switching nodes.

BACKGROUND OF THE INVENTION

In the field of data switching, the performance of data switching nodes participating in data transport networks is of utmost importance.

In provisioning data transport services, data is conveyed between data network nodes as specified by data transport protocols used. A body of data is typically generated by a source data network node and is forwarded through a data transport network by data switching equipment via associated interconnected data transport links towards a destination data network node. The data is encapsulated in Protocol Data Units or Payload Data Units (PDUs) as per corresponding data transport protocol specification.

In accordance with at least one data transfer protocol, the conveyed data is encapsulated in PDUs along with routing information. PDUs include and are not limited to: cells, frames, packets, etc. Each PDU has a size. Cells have a fixed size while frames and packets can vary in size.

Each PDU includes: a payload part holding at least a portion of the body of data to be conveyed; and a header part holding routing information, PDU processing parameters, etc. At least a portion of header information is consulted at each data switching node along the transport path to determine a route via which to forward PDUs towards the destination data network node. The PDU can be forwarded towards a group of destination data network nodes as is the case for multicast data traffic.

The header information includes specifiers detailing: the type of PDU, the size of the PDU, the size of the payload, the size and structure of the header, the source data network node, the destination data network node(s), other special instructions in processing the PDU such as a forwarding priority, a Class-of-Service, etc.

From a data transport network's point of view, data is conveyed in the data transport network hop-by-hop for the duration of a data transport session between data network nodes. PDUs are received by data switching nodes the via data transport links connected thereto and are processed to determine data transport links via which to convey the PDUs towards their intended destination.

From a data switching node's point of view, data switching nodes are multi-ported data network nodes which forward PDUs between input ports and output ports. The forwarding of PDUs represents the switching function of the data switching node. The basic operation of a data switching node includes: receiving at least one PDU, storing the PDU in a memory store while an appropriate output port is determined, determining the output port, scheduling the PDU for transmission, and transmitting the PDU via the determined output port. In the data transport field this is known as a "store and forward" method of operation of data switching nodes. Although the operation of data switching nodes is conceptually simple, the implementation of such devices is not trivial.

The storage of PDUs in the memory store provides a speed matching function as input ports, output ports and the switching function operate at different data processing rates. For this reason the memory store is also known as a memory buffer.

The storage of PDUs in the memory store also enables the gathering of data flow statistics (statistics generation function) in support of data flow control in policing the use of data transport resources.

The memory store itself represents a limited resource in processing PDUs because it has a limited size. If a PDU arrives at a data switching node and the memory store resources are exhausted, then the PDU has to be discarded. Efficient data transport attempts to minimize PDU discard instances.

One solution is to increase the size of the memory storage resources available to data switching nodes. Increasing the size of the memory storage resources comes with: increased complexity of the design of data switching nodes, increased development costs, increased component costs, increased maintenance costs, etc. Driving trends in the field of data switching call for stricter Quality-of-Service (QoS) requirements to be imposed on data flows as, ever increasing data throughput rates are demanded. Increasing memory storage resources at data switching nodes is a short term solution.

In attempting to diminish the occurrence of PDU discard instances, data switching nodes have been adapted to effect data flow control. As such, the statistics gathering function of data switching nodes is used to categorize PDUs according to associated data flows. The data flows are conveyed in accordance with specified enforceable data flow parameters. Heuristics are used to decide whether to forward, discard PDUs or regulate data flows at data switching nodes.

An example of a PDU forwarding rule specifies that PDUs should not be discarded from data flows that are well-behaved. Data flows which monopolize memory storage resources are considered to misbehave.

Typical data switching node designs include the use of a shared memory buffer for all data flows conveyed. This arrangement is referred to in the art as a shared memory switch architecture.

The use of a shared memory buffer makes fulfilling the requirement of not discarding PDUs associated with well-behaving data flows difficult due to the fact that the design leads to a phenomenon known in the art as blocking.

A blocking condition exists when one particular data flow uses all of the shared memory resources available and the data switching node is forced to discard incoming PDUs, including PDUs associated with well-behaved data flows.

When flow control is enabled for an input port and a PDU arrives at the data switching node having limited memory storage resources, the receiving input port is directed to issue a flow control pause command message upstream, causing data network nodes upstream of the data switching node to temporarily stop transmitting data.

For example, in accordance with the current specification of flow control enforcement found in Annex 31A of the 802.3 IEEE Standard 1998, all data flows conveying data via the input port effecting flow control are affected and required to temporarily halt transmission, including well-behaved data flows.

In supporting QoS, PDUs are also characterized with respect to Class-of-Service/forwarding priorities specified in PDU's header. QoS guarantees, which are also enforced at data switching nodes, cannot be guaranteed when flow control is active since the use of the pause command in the current specification of flow control causes all data flows to stop transmitting including well-behaved data flows. Therefore flow control is inherently at odds with assuring Quality-of-Service (QoS).

As another example of a PDU forwarding rule, PDUs should not be discarded from data flows that have high forwarding priorities. A similar problem, as explained above with respect to well behaved data flows, exists for data flows having a high forwarding priority in that: high forwarding priority PDUs arriving at a congested data switching node may be discarded because of low forwarding priority PDUs taking up shared memory buffer resources.

A prior art publication entitled "Data Networks"—$2^{nd}$ Edition which was published in 1992 by D. Bertsekas and R. Gallager, pp. 496–498, describes theoretical methods of implementing buffer management through rationing a shared buffer space. The presented approach is to divide the total shared buffer space into numerous reserved regions and one shared pool. The reserved regions ensure a small amount of buffer space for each data flow or Class-of-Service (CoS), so that even under conditions of congestion, well-behaved flows have guaranteed buffer space.

Although the presented methods provide theoretical methods of buffer management, in practice once the shared buffer space is filled all data flows may be subject to congestion. In theory it is assumed that once the shared buffer space is filled, the most likely data flow to convey a PDU next is a misbehaving data flow and therefore become subject to flow control. In practice well-behaving data flows convey data at or below service level agreement specified data throughput levels and in a large number of cases may have throughputs larger than misbehaving data flows. All data flows conveyed via the data switching node, including well-behaved data flows are subject to throughput variations, with the shared buffer space exhausted, variations in data throughput albeit minimal, detrimentally exposes the well-behaved data flows to flow control.

Therefore methods and data switching architectures are need to reduce blocking instances to minimal occurrence levels.

SUMMARY OF THE INVENTION

In accordance with an aspect of the invention, a data network node switching Protocol Data Units (PDUs) between a plurality of data ports is provided. Each PDU has a header storing header information and a payload storing at least a portion of data to be conveyed. The data network node comprises: processor switching PDUs and a shared memory buffer. The shared memory buffer is partitioned into: a reserved temporary memory storage portion and a PDU queuing memory storage portion. The temporary memory storage portion holds, while pending a preliminary inspection of the header information prior to queuing, PDUs received via an input port of the plurality of data ports. The PDU queuing memory storage portion holds PDUs pending processing in determining an output port from the plurality of data ports to switch the PDUs to. The arrangement reduces PDU discard instances at the data network node by enabling the discrimination of PDUs associated with well-behaved data flows from PDUs associated with misbehaving data flows prior to queuing thereof.

In accordance with another aspect of the invention, the PDU queuing memory storage portion further comprises a Classes-of-Service (CoS) PDU queuing portion. The CoS PDU queuing portion is subdivided into a plurality of reserved CoS processing queues. Each CoS processing queue holds, while pending processing, PDUs associated with a one of a plurality of classes-of-service supported at the data network node in providing support for Quality-of-Service guarantees ensuring the availability of minimum memory storage resources for data flows at the data network node.

In accordance with another aspect of the invention PDU queuing memory storage portion further comprises a shared memory-pool portion. The shared memory-pool portion holds, while pending processing, PDUs associated with data flows conveying PDUs at data rates above reserved data rates in providing QoS guarantees.

In accordance with another aspect of the invention the PDU queuing memory storage portion further comprises an input port PDU queuing portion. The input port PDU queuing portion is further subdivided into a plurality of reserved input port processing queues. Each input port processing queue holds, while pending processing, PDUs associated with a one of a plurality of input data ports of the data network node. Each one of the input port processing queues provides additional storage for PDUs associated with data flows conveying PDUs via the corresponding input port. Protection against blocking is provided for data flows conveyed via an input port from misbehaving data flows conveyed via other congested input ports.

In accordance with another aspect of the invention, a method of processing PDUs at a data network node is provided. The method includes a step of temporarily storing received PDUs in a reserved temporary memory storage portion of a shared memory buffer of the data network node prior to queuing for processing. The storage of the received PDU in the temporary memory storage portion prior to queuing for processing enables a header inspection in making a qualified determination regarding the discarding of PDUs.

In accordance with another aspect of the invention the method of processing PDUs, queues received PDUs in corresponding CoS processing queues in accordance with CoS specifications held in extracted header information. The use of CoS processing queues ensure minimum data throughput for data flows at the data network node.

In accordance with another aspect of the invention the method of processing PDUs, queues received PDUs in corresponding input port processing queues corresponding to input ports via which PDUs were received respectively. Use of input port processing queues is made as CoS PDU queuing memory storage resources and shared memory-pool portion are exhausted to limit misbehaving data flows from monopolizing memory storage resources at the data network node. The arrangement provides protection from blocking for well-behaved data flows conveyed over an input port from misbehaving data flows conveyed over other input data ports.

The advantages are derived from a buffer management scheme which can be equally applied in PDU discard and flow control environments minimizing blocking instances in both cases while reducing memory storage requirements. Provisions are made for PDU discard decisions to be delayed until after PDU headers are inspected. Further provisions are made for PDU discard decisions to be delayed as long as possible protecting input ports carrying well-behaved data flows from being blocked. The methods provide for minimal use of memory storage resources in implementing thereof.

BRIEF DESCRIPTION OF THE DIAGRAMS

The features and advantages of the invention will become more apparent from the following detailed description of the preferred embodiment with reference to the attached diagrams wherein:

FIG. 4 is a flow diagram showing process steps of a flow control subprocess performed by a data switching node in accordance with the preferred embodiment of the invention;

It will be noted that, in the attached diagrams, like features bear similar labels.

DETAILED DESCRIPTION OF THE EMBODIMENTS

Field trials show that "best effort" data traffic is most likely to cause a congestion condition at a data switching node leading to blocking instances. Increasing the size of the memory storage as a solution to reducing blocking instances at the data switching node has shown to lead to unnecessary additional costs and complexity for a short term gain.

In accordance with the invention, solutions to minimizing PDU discard instances at data switching nodes are provided under the proviso that intelligent management of memory storage resources, under the assumption that they are scarce, is a long term solution. Protecting well-behaved data flows from blocking, PDU discard instances are more likely to be associated with best effort data traffic.

Figure 1:
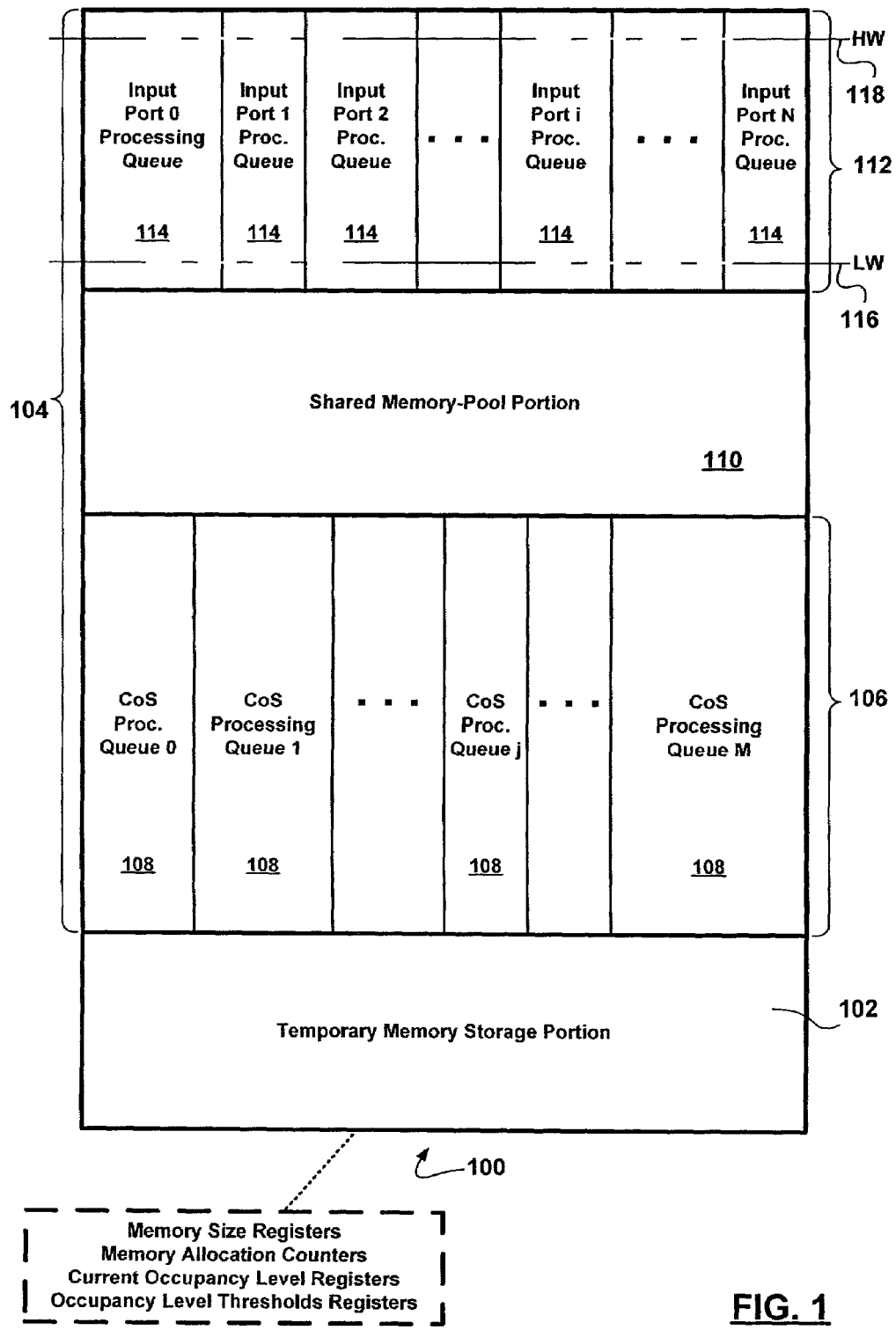
FIG. 1 is a schematic diagram showing a partitioned shared memory buffer in accordance with the preferred embodiment of the invention.

FIG. 1 is a schematic diagram showing a partitioned shared memory buffer used by a data switching node in accordance with the preferred embodiment of the invention.

In operation, as a PDU is received at the data switching node (not shown), its header information has not yet been examined to determine an associated PDU treatment such as Class-of-Service (CoS) and/or an associated forwarding priority. In accordance with the invention, the decision whether to drop the PDU is postponed at least until the header information is inspected irrespective of the congestion state of the data switching node.

A shared memory buffer 100 is divided, in accordance with a preferred memory management scheme, into a reserved temporary memory storage portion 102 and a PDU queuing memory storage portion 104. The temporary memory storage portion 102 is used to store received PDUs prior to inspection thereof.

The size of the temporary memory storage portion 102 can be engineered to provide storage for incoming PDUs at the intended PDU processing rate of the data switching node. An upper bound on the required memory size of this memory storage portion can be calculated and consequently this memory storage resource should never be exhausted.

In accordance with another implementation of the invention in which at least one of the N input ports of the data switching node is adapted to transmit at adjustable rates, the size of the temporary memory storage portion 102 can be modified correspondingly to enable optimal use of memory storage resources at the data switching node.

The size of the temporary memory storage portion 102 may be modified manually via a management console associated with the data switching node, a table lookup access made upon reconfiguring the data switching node, a higher level management protocol, etc. without departing from the spirit of the invention.

When inspecting PDUs stored in the temporary memory storage portion 102, the header information is extracted therefrom including: an input port designation via which the PDU was received, PDU processing treatments such as, but not limited to, a CoS and/or a forwarding priority to be used in processing the PDU, a destination data network node identifier, the size of the PDU, the size of the payload conveyed by the PDU, etc.

The invention is not limited to processing only the above-mentioned extracted header information; persons of ordinary skill in the art would recognize that a variety of such parameters may be extracted therefrom and used as necessary in processing PDUs at the data switching node without departing from the spirit of the invention.

A subprocess showing details of a preferred PDU switching process is presented herein below with respect to FIG. 2 as it applies to processing incoming PDUs.

In accordance with the above mentioned preferred memory management scheme, the PDU queuing memory storage portion 104 includes a reserved CoS PDU queuing memory storage portion 106.

The CoS PDU queuing portion 106 is further divided defining reserved CoS PDU processing queues 108: each CoS processing queue 108 being associated with a corresponding one of M classes-of-service supported at the data switching node.

In accordance with an implementation of the invention, data flows not associated with a CoS are by default classified as best effort traffic and processed through a CoS processing queue 108—for example the $M^{th}$ CoS processing queue 108.

Subsequent to the extraction of the header information, PDUs stored in the temporary memory storage portion 102 are associated with corresponding CoS processing queues 108 if memory storage space is available therein. Each CoS processing queue 108 has an associated memory size set to accommodate data throughput associated with the corresponding class-of-service supported at the data switching node.

As each data flow has an associated CoS, it is also associated with a data transport session. Each data transport session is defined for a period of time. Efficient use of memory resources at the data switching node requires careful allotment thereof. Ways in which the memory sizes of the CoS processing queues 108 can be adjusted include but are not limited to: the use of a management console associated with the data switching node, a higher level protocol enforcing Quality-of-Service (QoS) guarantees, etc.

Data flows conveyed in accordance with QoS guarantees have predefined minimum, sustainable and maximum transmit data rates. Typically on data transport session setup, the data switching node reserves resources, including memory resources, in accordance with minimum guaranteed transmit data rate specifications to ensure a guaranteed throughput under any circumstances. Maximum data transmit rates specify short term data burst size limitations while sustainable data transmission rates represent long term maximum transmit rates assuming availability of resources. Data flows are considered to be well-behaved while transmitting either at or below sustainable transmit data rates which may necessitate the use of memory storage resources beyond the CoS processing queue 108 reservations.

The reservation of the CoS processing queues 108 ensures that low forwarding priority or best effort PDUs contributing to a congestion condition at the data switching node cannot monopolize all memory storage resources available. The processing of best effort data traffic through a CoS processing queue 108 ensures a minimum throughput to be allocated thereto.

In accordance with a preferred implementation of the invention PDUs stored in the CoS processing queues 108 are labeled as such. Various methods of labeling PDUs may be used without departing from the spirit of the invention including the preferred use, and the assertion of, CoS processing queue storage bits each of which is associated with a PDU stored in the CoS processing queues 108.

In accordance with the above mentioned preferred memory management scheme the PDU queuing portion 104 further includes a shared memory-pool portion 110.

The shared memory-pool portion 110 is used as overflow as individual occupancy levels of CoS processing queues 108 exceed respective memory allocations.

In accordance with another implementation of the invention, best effort data traffic is primarily processed through the shared memory-pool portion 110 without using resources reserved for CoS processing queues 108.

In accordance with the above mentioned preferred memory management scheme, the PDU queuing memory storage portion 104 further includes reserved input port memory storage portion 112. The input port memory storage portion 112 further is divided into reserved input port PDU processing queues 114, one input port processing queue 114 for each one of the N input ports of the data switching node. Like the CoS processing queues 108, the input port processing queues 114 prevent blocking of well-behaved data traffic flows conveyed via an input port from a misbehaving data traffic flow conveyed via another input port.

The input port processing queues 114 are used as overflow memory storage space as the shared memory-pool portion 108 has been used up.

Each input port processing queue 114 has an associated memory size. The memory size of each input port processing queue 114 can be modified to minimize PDU discard instances at the data switching node. Memory size modifications may be effected manually via a management console associated with the data switching node, a higher level protocol enforcing flow control at the data switching node, a higher level protocol enforcing QoS guarantees, etc.

As an input port processing queue 114 fills up, only subsequently arriving PDUs associated with data flows conveyed via the corresponding input port are discarded protecting other input ports from experiencing blocking conditions.

In providing flow control, each input port processing queue 114 has an associated low watermark level (LW) 116 and a high watermark level of occupancy (HW) 118. Methods of effecting data flow control will be presented herein below with reference to FIG. 4.

In accordance with the preferred embodiment of the invention, the partition of the shared memory buffer 100 is virtual, and is maintained via memory size registers and memory allocation counters indicating how much memory storage space is allocated to each processing queue and the temporary memory storage portion 102 at any time. The size of the shared memory-pool portion 110 makes up for the reminder of the shared memory buffer 100.

Once stored in the shared memory buffer 100, PDUs are associated with the temporary memory storage portion 102, various processing queues and the shared memory-pool portion 110 via the above mentioned memory allocation counters which are updated as PDUs stored in the temporary memory storage portion 102 are associated with the PDU queuing memory storage portion 104.

Figure 2:
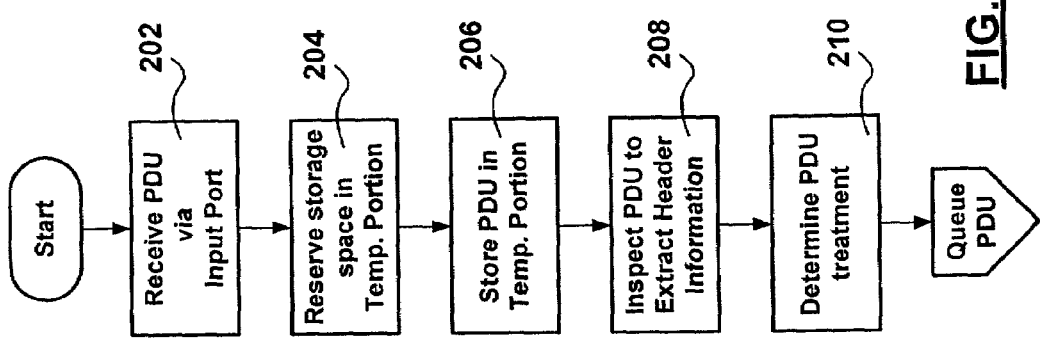
FIG. 2 is a flow diagram showing process steps of a PDU receiving subprocess performed by a data switching node in accordance with the preferred embodiment of the invention.

FIG. 2 is a flow diagram showing process steps performed by a data switching node in receiving a PDU via an input port, in accordance with the preferred embodiment of the invention.

A PDU is received via an input port in step 202, a portion of the shared memory buffer 100 in the temporary memory storage portion 102 is reserved (204) for the PDU and the PDU is stored therein (206). The stored PDU is inspected to extract header information therefrom in step 208. A PDU treatment such as a CoS specification and/or a forwarding priority specification associated with the PDU is determined in step 210. PDU processing continues with queuing the PDU.

Figure 3:
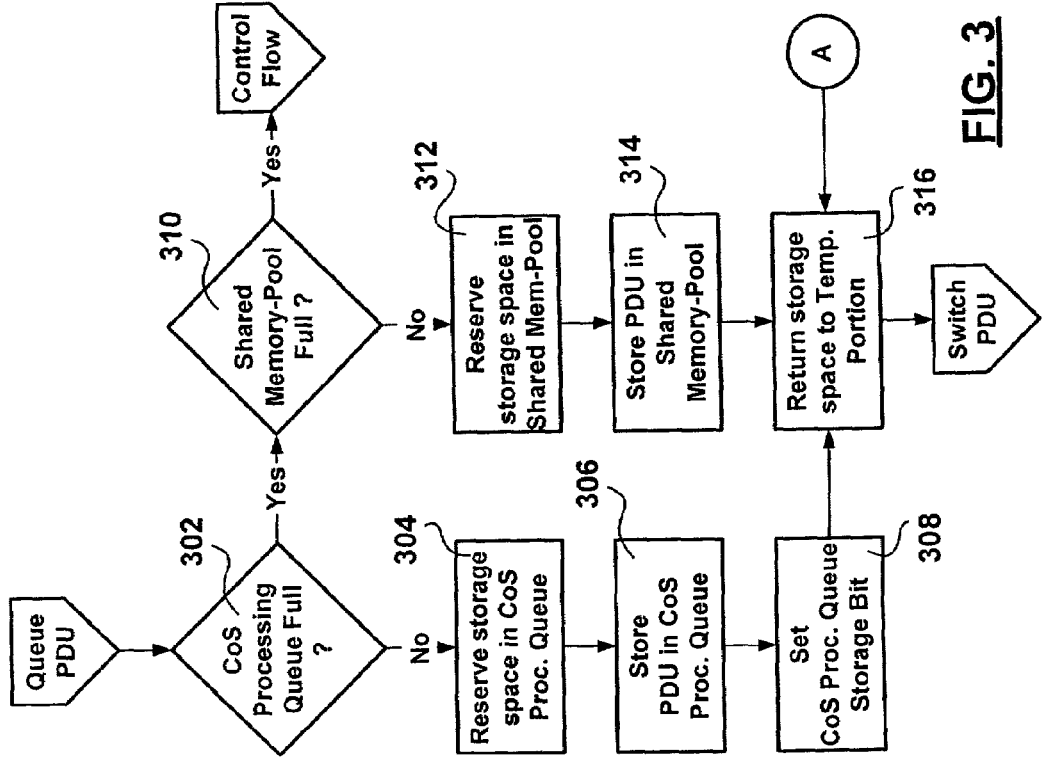
FIG. 3 is a flow diagram showing process steps of a queuing subprocess performed by a data switching node in accordance with the preferred embodiment of the invention.

FIG. 3 is a flow diagram showing process steps performed by a data switching node in queuing a received PDU in accordance with the preferred embodiment of the invention.

In queuing the received PDU, the process checks 302 whether the corresponding CoS processing queue is full.

If the corresponding CoS processing queue 108 is not full, then memory storage space is reserved 304 and the PDU is stored 306 therein. In step 308, as the PDU is stored in the corresponding CoS processing queue 108, the PDU is labeled as such by asserting the CoS processing queue storage bit associated with the PDU. The corresponding storage space used in the temporary memory storage portion 102 is returned 316 to the temporary memory storage portion 102.

If, in step 302, the corresponding CoS processing queue 108 is full, then the process checks 310 whether there is available storage space in the shared memory-pool portion 110.

If there is memory storage space available in the shared memory-pool portion 110, the process continues by reserving memory storage space 312 in the shared memory-pool portion 110, storing 314 the PDU therein and returning 316 the memory storage space held to the temporary memory storage portion 102. The process continues with switching the PDU.

FIG. 4 is a flow diagram showing process steps performed by a data switching node in enforcing flow control in accordance with the preferred embodiment of the invention.

Should the shared memory-pool portion 110 be found full in step 310, the process checks in step 400 whether flow control is active at the data switching node.

If the flow control is active, the process checks, in step 402, whether the occupancy of the input port processing queue 114 associated with the input port via which the PDU was received is below the corresponding low watermark level 116.

If the occupancy of the input port processing queue 114 is below the low watermark level 116, then the process checks whether a pause command is in effect, in step 404.

Should the pause command be found to be in effect, in step 404, the process clears the pause command state in step 406, reserves memory storage space in the input port processing queue 114 in step 408, stores (410) the PDU therein, and resumes from step 316 returning memory storage resources held by the PDU to the temporary memory storage portion 102.

If in step 404 the process does not find the pause command to be in effect, the process resumes from step 408.

Should the occupancy of the input port processing queue 114 be found, in step 402, to be above the low watermark 116, the process checks, in step 412, whether the occupancy of the input port processing queue 114 is above the high watermark 118.

If the occupancy level of the flow control processing queue 114 is not found to be above the high watermark 118, then the process resumes from step 408 in reserving storage space for the received PDU in the input port processing queue 114.

If the occupancy level is found to be above the high watermark 118 in step 412, the process checks in step 414 whether a pause command is in effect.

Should the pause command be found to be in effect in step 414 the process checks in step 420 whether the input port processing queue 114 is full.

If the input port processing queue 114 is not full, the process continues from step 408.

Should the flow control processing queue 114 be found to be full in step 420, the process continues by discarding the PDU in step 422.

Should the pause command not be found to be in effect in step 414, the process activates the pause command state in step 416 and sends (418) a pause command upstream of the data switching node via the associated input port associated with the received PDU to regulate data flows conveyed therethrough. The process resumes from step 420 in attempting to store the received PDU in the flow control processing queue 114.

If flow control is not enforced at the data switching node, then the process resumes from step 420.

The method of triggering flow control described above delays the assertion of the pause command state and once asserted delays the resetting thereof until a large portion of the flow control processing queue 114 has been freed (hysteresis).

Other methods of triggering flow control including the use of a single occupancy level threshold may be used without departing from the spirit of the invention.

Figure 5:
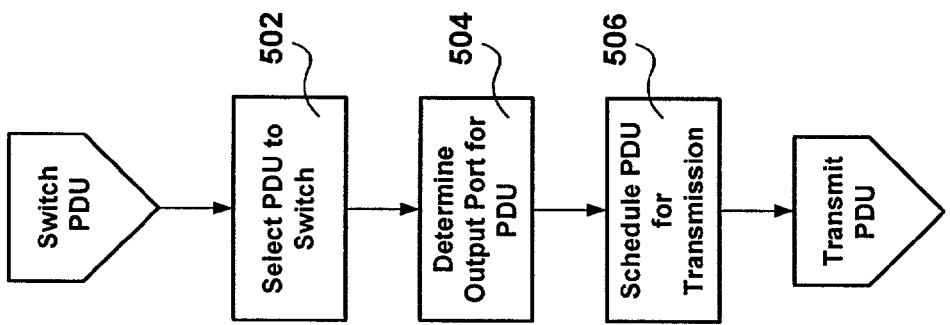
FIG. 5 is a flow diagram showing process steps of a switching subprocess performed by a data switching node in accordance with the preferred embodiment of the invention.

FIG. 5 is a flow diagram showing process steps performed by a data switching node in switching a queued PDU in accordance with the preferred embodiment of the invention.

In switching queued PDUs, the process selects a PDU to switch in step 502. Methods of PDU selection for switching including providing support for forwarding priority processing exist and are outside of the scope of the present description. The process determines an output port to switch the PDU to, in step 504, and schedules the switched PDU for transmission in step 506. The process continues with transmitting the PDU.

Figure 6:
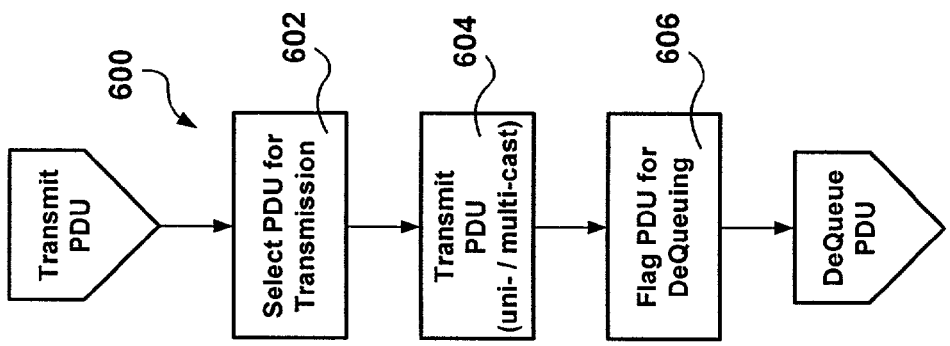
FIG. 6 is a flow diagram showing process steps of a transmission subprocess performed by a data switching node in accordance with the preferred embodiment of the invention.

FIG. 6 is a flow diagram showing process steps performed by a data switching node in transmitting a queued PDU in accordance with the preferred embodiment of the invention.

A PDU is selected in step 602 and transmitted in step 604. The transmission subprocess 600 shown is overly simplified. Persons of ordinary skill in the art would understand that the transmission subprocess may include other steps such as: enforcing further flow control, provisions for replicating data traffic in multicasting; further data encapsulation; etc. without departing from the spirit of the invention. On completing PDU transmission, the PDU is flagged for dequeuing.

Figure 7:
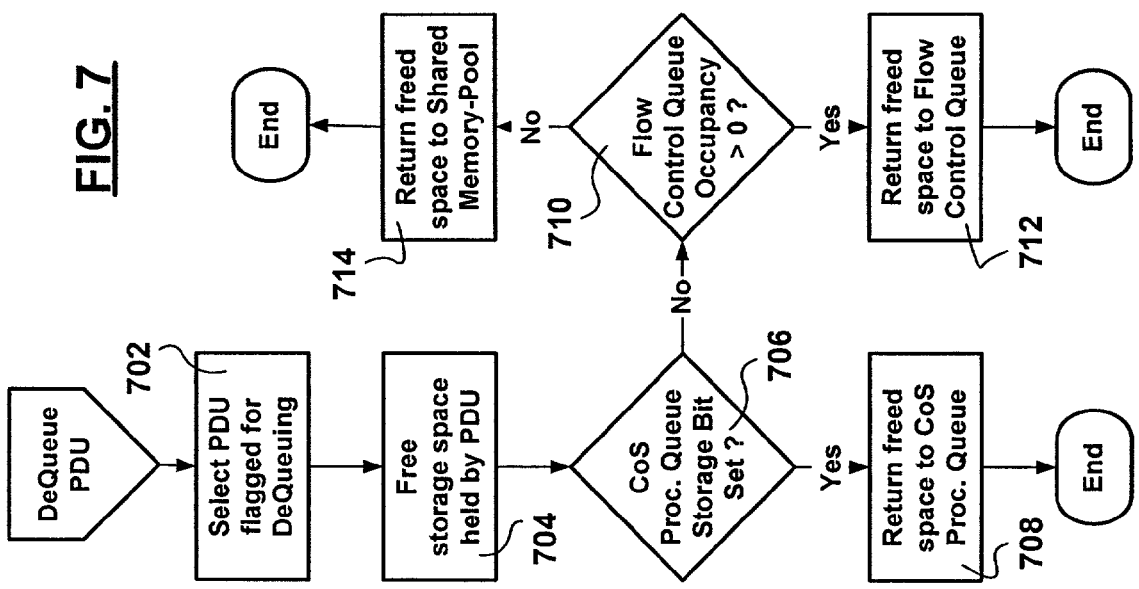
FIG. 7 is a flow diagram showing process steps of a dequeuing subprocess performed by a data switching node in accordance with the preferred embodiment of the invention.

FIG. 7 is a flow diagram showing process steps performed by a data switching node in dequeuing a transmitted PDU in accordance with the preferred embodiment of the invention.

In dequeuing the transmitted PDU (702), the reserved memory storage space is freed up in step 704. The processing queues 108 and 114 have predefined memory sizes specified via the above mentioned registers and occupancy levels specified via the above mentioned counters.

If the CoS processing queue storage bit is set (706), then the freed memory storage space is returned 708 to the CoS processing queue 108 corresponding to the transmitted PDU.

If the CoS processing queue storage bit is not set (706), then, in step 710, the occupancy of the input port processing queue 114 corresponding to the input port on which the transmitted PDU was received is inspected.

If the occupancy level is above 0 then the freed storage space is returned to the input port processing queue 114 in step 712.

If the occupancy of the corresponding input port processing queue 114 is 0, then the process returns the freed memory storage space to the shared memory-pool portion 110 in step 714.

Further details of the invention are presented herein below with reference to the attached Appendix.

The embodiments presented are exemplary only and persons skilled in the art would appreciate that variations to the above described embodiments may be made without departing from the spirit of the invention. The scope of the invention is solely defined by the appended claims.

We claim:

1. A data network node switching Protocol Data Units (PDUs) between a plurality of data ports, each PDU having a header storing header information and a payload storing at least a portion of data to be conveyed, the data network node comprising:
  a. a processor switching PDUs; and
  b. a shared memory buffer comprising:
   i. a reserved temporary memory storage portion for holding, while pending a preliminary inspection of the header information prior to queuing, PDUs received via an input port of the plurality of data ports; and
   ii. a PDU queuing memory storage portion for holding PDUs pending processing in determining at least an output port from the plurality of data ports to switch the PDU to, the PDU queuing memory storage portion further comprising a Classes-of-Service (CoS) PDU queuing portion including a plurality of reserved CoS processing Queues, each CoS processing queue holding, while pending processing. PDUs associated with a one of a plurality of classes-of service supported at the data network node in providing support for Quality-of-Service guarantees ensuring the availability of minimum memory storage resources for data flows at the data network node,
  whereby the arrangement reduces PDU discard instances at the data network node by enabling the discrimination of PDIJs associated with well-behaved data flows from PDUs associated with misbehaving data flows prior to queuing thereof.

2. A data network node as claimed in claim 1, wherein a CoS processing queue is designated for storing while processing, PDUs without a specified class-of-service (best effort data traffic PDUs).

3. A data network node as claimed in claim 1, wherein at least one CoS processing queue has an adjustable memory size.

4. A data network node as claimed in claim 3, wherein the memory size of at least one CoS processing queue is modified via one of: a management console and a higher level protocol enforcing Quality-of-Service (QoS) guarantees.

5. A data network node as claimed in claim 1, wherein the data network node further comprises a plurality of CoS processing queue storage bits, each CoS processing queue storage bit being associated with a PDU stored in CoS processing queues.

6. A data network node as claimed in claim 1, wherein the PDU queuing memory storage portion further comprises a shared memory-pool portion holding, while pending processing, PDUs associated with data flows conveying PDUs at data rates above reserved data rates in providing QoS guarantees.

7. A data network node as claimed in claim 6, wherein the shared memory-pool portion further holds while pending processing PDUs without a specified class-of-service (best effort data traffic PDUs).

8. A data network node as claimed in claim 1, wherein the PDU queuing memory storage portion further comprises an input port PDU queuing portion including a plurality of reserved input port processing queues, each input port processing queue holding, while pending processing, PDUs associated with a one of a plurality of input data ports of the data network node providing additional storage for PDUs associated with data flows conveying PDUs via the input port whereby protection against blocking is provided for data flows conveyed via the input port from misbehaving data flows conveyed via other congested input ports.

9. A data network node as claimed in claim 8, wherein at least one input port processing queue has an adjustable memory size.

10. A data network node as claimed in claim 9, wherein the memory size of the at least one input port processing queue is modified via one of: a management console, a higher level protocol enforcing Quality-of-Service (QoS) guarantees and a higher level protocol enforcing flow control.

11. A data network node as claimed in claim 8, wherein each input port processing queue has an associated high watermark level for comparison against a level of occupancy of the input port flow control processing queue in effecting input port flow control.

12. A data network node as claimed in claim 11, wherein at least one high watermark level is adjustable.

13. A data network node as claimed in claim 12, wherein the value of the high watermark level is modified via a one of: a management console, a higher level protocol enforcing Quality-of-Service (QoS) guarantees and a higher level protocol enforcing flow control.

14. A data network node as claimed in claim 11, wherein each input port processing queue has an associated low watermark level for comparison against a level of occupancy of the input port processing queue in effecting input port flow control.

15. A data network node as claimed in claim 14, wherein at least one low watermark level is adjustable.

16. A data network node as claimed in claim 15, wherein the value of the low watermark level is modified via a one of: a management console, a higher level protocol enforcing Quality-of-Service (QoS) guarantees and a higher level protocol enforcing input port flow control.

17. A method of processing Protocol Data Units (PDUs) at a data network node having a processor switching PDUs and a shared memory buffer including a PDU queuing memory storage portion further including a Class-of-Service (CoS) PDU memory storage portion, the CoS PDU memory storage portion further including a plurality of CoS processing queues associated with a group of classes-of-service supported at the data network node, the method comprising steps of:
 a. receiving a PDU via an input data port of the data network node;
 b. temporarily storing the received PDU in a reserved temporary memory storage portion of the shared memory buffer;
 c. extracting header information from the stored PDU;
 d. selectively queuing the PDU for processing in a corresponding CoS processing queue in accordance with a CoS specification held in the extracted header information if the CoS processing queue is not full;
 e. switching the PDU; p1 f. transmitting the PDU via an output data port of the data network node; and
 g. deallocating resources used by the transmitted PDU,
 whereby the storage of the received PDU in the temporary memory storage portion prior to header inspection provides for a qualified determination to be made in discarding PDUs.

18. A method as claimed in claim 17, wherein queuing the PDU in the corresponding CoS processing queue, the method further includes a step of setting an associated CoS processing queue storage bit corresponding to each PDU queued therein.

19. A method as claimed in claim 17, wherein the PDU queuing memory storage portion further includes a shared memory-pool portion and the step of selectively queuing the PDU for processing, the method further comprises a step of: queuing the PDU in the shared memory-pool portion if the CoS processing queue corresponding to the PDU is full.

20. A method as claimed in claim 19, wherein the method further comprises a step of: primarily queuing PDUs without a specified class-of-service (best effort data traffic PDUs) in the shared memory-pool portion.

21. A method as claimed in claim 19, wherein the PDU queuing memory storage portion further includes an input port PDU queuing storage portion, the input port PDU queuing storage portion further includes a plurality of input port processing queues, each input port processing queue being associated with an input port of the data network node, and the step of selectively queuing the PDU for processing, the method further comprises a step of: queuing the PDU in a input port processing queue corresponding to the input port on which the PDU was received if the shared memory-pool resources have been exhausted.

22. A method as claimed in claim 21, wherein the method further comprises the step of enforcing input port flow control.

23. A method as claimed in claim 22, wherein enforcing input port flow control each input port queue has an associated high watermark level against which a level of occupancy of the input port processing queue is compared in effecting flow control.

24. A method as claimed in claim 22, wherein enforcing input port flow control each input port flow control queue has an associated low watermark level against which a level of occupancy of the input port processing queue is compared against in clearing a congested state of the data network node.

25. A method as claimed in claim 17, wherein deallocating resources used by the transmitted PDU, the method further comprises a step of: returning memory space used by the transmitted PDU to a CoS processing queue if the PDU was queued for processing therein.

26. A method as claimed in claim 25, wherein returning the memory space used by the transmitted PDU to a CoS processing queue the method further comprises a step of: determining whether a CoS processing queue storage bit associated with the transmitted PDU had been previously set.

27. A method as claimed in claim 21, wherein deallocating resources used by the transmitted PDU, the method further comprises a step of: returning the freed memory space to the corresponding input port processing queue if the level of occupancy thereof is not zero.

28. A method as claimed in claim 27, wherein deallocating memory resources used by the transmitted PDU, the method further comprises a step of: returning the freed memory space to the shared memory-pool portion if a corresponding flow control processing queue occupancy level is zero.

* * * * *